July 10, 1934.  F. C. SCHMELKES  1,966,265
METHOD AND MEANS FOR SUPPLYING CHLORINE GAS
Filed Feb. 23, 1932
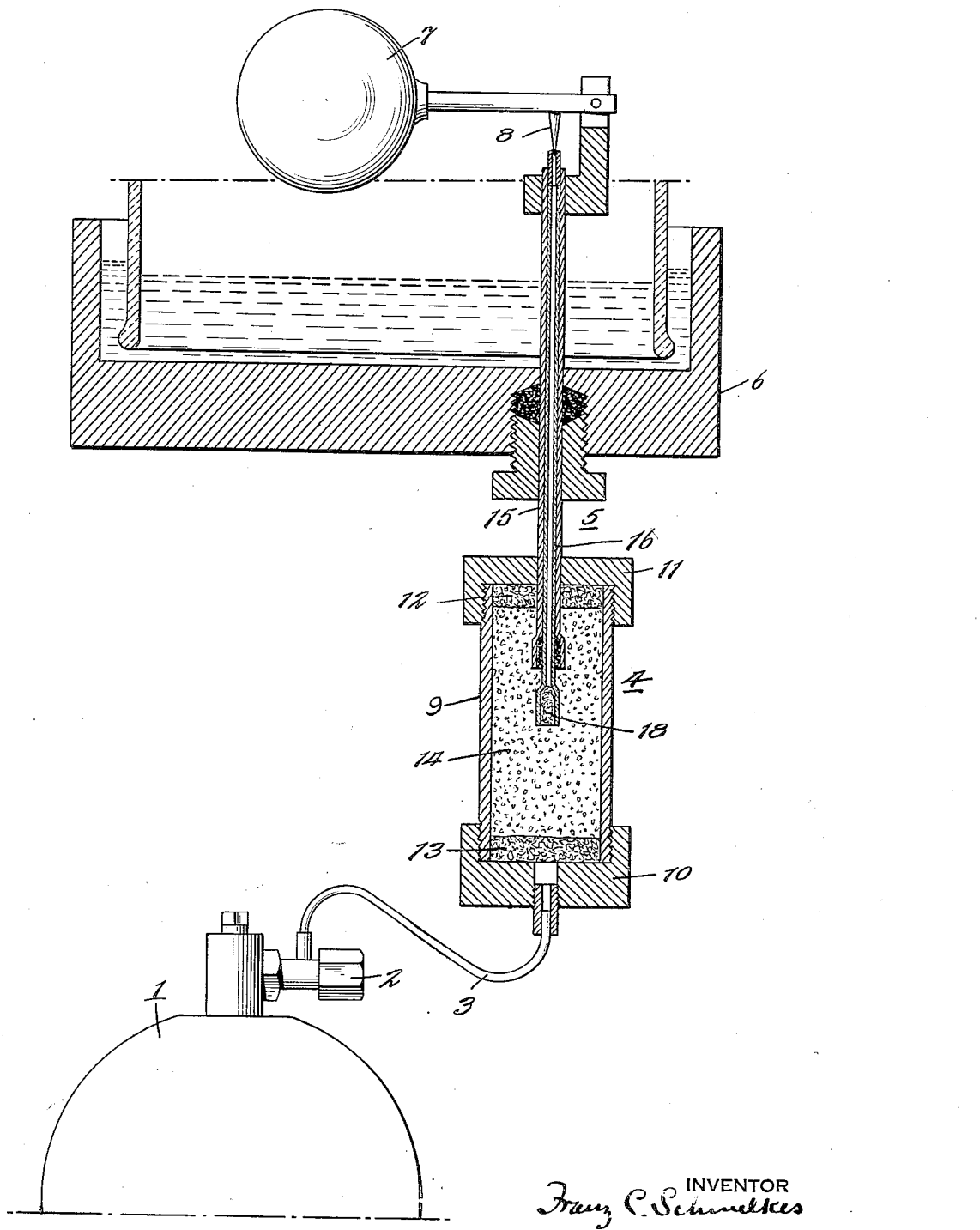
INVENTOR
Franz C. Schmelkes
BY
his ATTORNEY Patented July 10, 1934

1,966,265

UNITED STATES PATENT OFFICE 1,966,265

METHOD AND MEANS FOR SUPPLYING CHLORINE GAS

Franz C. Schmelkes, Bloomfield, N. J., assignor to Wallace & Tiernan Company, Inc., Belleville, N. J., a corporation of New York Application February 23, 1932, Serial No. 594,586

8 Claims. (Cl. 210—28)

This invention relates to supplying a regulated flow of chlorine gas, and has for its object the provision of a method and means for controlling the flow of chlorine gas; more particularly the invention aims to provide a method and means whereby foreign impurities in chlorine gas are removed and consequently do not deposit in and clog up valves or other parts employed in controlling or metering the flow of chlorine in chlorinating apparatus, such as is used for treating water.

Chlorine is a highly reactive material and tends to react with the material, such as steel, composing the cylinder in which it is confined and with impurities, such as oils, which are present in commercial chlorine. As a result the gas drawn off from cylinders of liquid chlorine contains small amounts of ferric chloride, chlorinated oils, such as hexachlorethane, and other products. These chlorine-containing materials form sticky, gummy deposits which are apt to clog or choke the fine orifices used for controlling and/or metering the flow of chlorine.

One of the most frequent causes of the clogging up of pressure reducing valves and other flow-controlling orifices is the liquefaction of chlorine in the supply line extending from the cylinder of liquid chlorine to such valve. The pressure behind the valve or other orifice may be substantially the liquefaction pressure at ordinary room temperatures, so that a drop in the temperature in the supply line may cause condensation of chlorine in the line. This liquid chlorine dissolves any metallic chlorides, chlorinated oils, etc., which are present, and carries them along to the valve orifice. At that point the reduction in pressure causes the liquid chlorine to evaporate, and such evaporation causes a deposit of the material previously dissolved in the liquid chlorine.

I have found that it is possible to remove such gummy material from chlorine gas by passing the gas over an adsorptive material, such as silica gel, activated carbon or the like. The separation of such gummy material by adsorptive substances depends on the property of selectivity, characteristic of adsorption phenomena. If chlorine gas is passed through or over silica gel, it will adsorb chlorine until equilibrium is reached, the amount of chlorine adsorbed being dependent upon the temperature and pressure. If other substances are passed through the silica gel, which are more readily adsorbed thereby, there is a replacement of a part of the adsorbed chlorine by such substances.

The readiness with which a gas is adsorbed is largely an inverse function of its volatility, and that, in turn, is largely dependent on the molecular weight of the substance. Thus, a substance like hexachlorethane is less volatile and more readily adsorbed than chlorine. Hexachlorethane, $CCl_3.CCl_3$, boils or sublimes under atmospheric pressure at around 185° C. and has a molecular weight of 237. Chlorine boils at −33.6° C. and has a molecular weight of 71.

The customary method of controlling flow of chlorine from a cylinder of liquid chlorine involves the use of one or more flow-controlling restrictions beyond the valve on the end of the cylinder, the first being usually a pressure-reducing valve. The cylinder valve is customarily opened wide, so that, even if deposition of gummy material occurs in the latter valve it will not appreciably interfere with the flow of chlorine therethrough. Then, by placing a filter of adsorptive material in the chlorine line between the cylinder valve and the first flow-controlling restriction, the gummy materials are removed before the chlorine reaches the restriction where deposition of such materials might otherwise occur and result in clogging or seriously interfering with the flow of chlorine therethrough.

It is desirable to place the filter in as close proximity to the reducing valve as possible to eliminate as far as practicable any condensation of liquid chlorine between the filter and the reducing valve and the possibility of the formation of metallic chlorides, chlorinated oils and the like, between the filter and the reducing valve. Advantageously, the line between the filter and the reducing valve is formed of or lined with vitreous material, such as glass, to avoid the formation of metallic chlorides.

Many chlorinators, such, for example, as those now in use for treating water, are equipped with flow meters of the type in which the rate of flow is determined by the drop in pressure across a restricted orifice. Partial choking of such orifice not only reduces the flow of chlorine but the meter reads too high, and regulation of the chlorine supply by such meter readings may easily result in adding to the water insufficient chlorine to produce sterilization. The choking of the meter orifice is apt to have more serious consequences than the choking of other restrictions, as in the latter case the meter indicates immediately when proper flow of chlorine ceases, whereas when the meter itself is out of adjustment there is nothing to give notice of that fact. Hence, while for reasons above stated it is usually desirable to place the filter between the cylinder valve and the pressure reducing valve, the filter may on the other hand be inserted between the pressure reducing valve and the meter and still retain much of the advantages resulting from the elimination of gummy materials from the chlorine.

Provided the chlorine is dry and the purification takes place at a point where access of moisture is impossible, activated carbon is preferable to silica gel, as carbon has a larger capacity for the gummy impurities. If, however, the chlorine contains moisture, either originally or by reason of the fact that the filter is located so that access of moisture is not entirely prevented, silica gel is preferable as the adsorbing material. Any other adsorbent or adsorbents may be used provided their chemical and physical properties permit.

While the chief impurities to be eliminated are ferric chloride and chlorinated oils, there may be and doubtless are others. Some impurities, such as nitrogen and oxygen, are not extracted by silica or the like. However, such impurities are not deposit-forming, and, hence, do not tend to clog the valve orifices or other orifices and other working parts. While some of the impurities, such as ferric chloride, are not to be classed as gums, the term gummy materials is employed in the specification and claims to include anything capable of forming an adherent deposit to reduce or clog a flow-controlling orifice or the like and also the constituents of such deposits which are non-adherent per se.

A full understanding of the invention can best be given by a description thereof in connection with a somewhat diagrammatic sectional showing of parts of an illustrative embodiment of the invention in the accompanying drawing.

The invention is shown as applied to a chlorinating apparatus of the general type illustrated and described in U. S. Patent No. 1,777,986 of Wallace.

A cylinder of liquid chlorine is indicated at 1, and chlorine gas is led therefrom through a shut off valve 2 and tube 3 to the purifying device designated generally as 4. From such device the gas passes upwardly by a tube 5 through the bottom of a water tray 6. This water tray is adapted to support a bell jar and other parts as disclosed in the above mentioned Wallace patent. Of these parts only the float-controlled pressure reducing valve, by which a desired reduced gas pressure is maintained within the bell jar, is shown, comprising a float 7 which operates a needle valve 8 controlling the flow of gas from the end of the tube 5, as illustration of the other parts is not necessary to a full understanding of the principles and mode of operation of the present invention.

The purifying device comprises a cylinder 9 of metal or other suitable material closed at its ends by screw caps 10 and 11. The cylinder is filled, except for packing layers of glass wool 12 and 13 at top and bottom, with suitable adsorptive material 14, such as silica gel.

Since, for reasons given above, it is desirable to avoid entirely, or at least to restrict to a minimum, contact between the chlorine gas and metals between the point at which the chlorine leaves the adsorptive purifying material and the orifice where deposition of adherent material would be deleterious, the tube 5 may have an inner surface of glass. As shown, the tube 5 is formed of an outer tube 15 of silver and an inner tube 16 of glass. The silver tube is enlarged at its lower end to permit sealing in the glass tube. The glass tube is arranged to extend in a downward direction below the bottom of the silver tube so that the former may be enlarged to receive a packing 18 of glass wool which prevents the adsorptive material passing upwardly into the glass tube and possibly clogging the needle valve. For the same reason it is advantageous that the adsorptive material should, as far as practicable, be granular in form and as free from dust and fine particles as possible.

In operation, the valve 2 is opened wide or fairly wide so that clogging thereof is practically impossible and the desired pressure control is obtained by the pressure reducing needle valve 8.

What is claimed is:

1. The method of supplying a regulated flow of chlorine gas, which comprises passing such gas through a filter of adsorptive material adapted to remove gummy materials therefrom, and passing the so purified gas through a flow-controlling orifice so small in size as to become clogged by gummy substances deposited from impure chlorine gas passed therethrough.

2. The method of supplying a regulated flow of chlorine gas, which comprises passing chlorine gas at substantially the vapor pressure of liquid chlorine at the prevailing room temperature through a filter of adsorptive material adapted to remove gummy materials from such chlorine gas, and passing the so purified gas through a flow-controlling orifice so small in size as to become clogged by gummy substances deposited from impure chlorine gas passed therethrough.

3. The method of controlling the flow of chlorine gas from liquid chlorine, which comprises permitting chlorine gas to vaporize from the liquid chlorine, passing the said gas through a filter of adsorptive material, thereby removing gummy materials therefrom, and passing the so purified gas through a flow-controlling orifice so small in size as to become clogged by gummy substances deposited from impure chlorine gas passed therethrough.

4. The method of supplying a regulated flow of chlorine from a container of liquid chlorine, which comprises passing chlorine gas from such container over material which has the capability of physically adsorbing onto its active surface impurities capable of gumming up small orifices and delicate valves, and substantially immediately thereafter passing the so-purified gas through a pressure reducing orifice so small in size as to become clogged by gummy substances deposited from impure chlorine gas passed therethrough.

5. The method of supplying a regulated flow of chlorine gas from a container of liquid chlorine, which comprises passing chlorine gas from said container through a relatively wide open valve, then passing the gas through a filter of adsorptive material adapted to remove gummy materials from the chlorine, and then passing the filtered gas through a flow-controlling orifice so small in size as to become clogged by gummy substances deposited from impure chlorine gas passed therethrough, the valve having a flow passage large enough to avoid clogging by the deposition of gummy material, and the filter acting to remove such material which might otherwise clog such flow-controlling orifice.

6. An apparatus for supplying a regulated flow of chlorine gas, which comprises a container of liquid chlorine, and a flow line leading from the container which includes a filter of adsorptive material adapted to remove gummy materials from chlorine gas discharged from the container, the pressure in said filter being substantially the vapor pressure of liquid chlorine at the prevailing room temperature, and means for controlling the flow of chlorine gas from said filter comprising a pressure reducing valve having in normal operation a passage therethrough so small in size as to become clogged by gummy substances deposited from impure chlorine gas passed therethrough.

7. An apparatus for supplying a regulated flow of chlorine gas, which comprises a container of liquid chlorine, and a flow line leading from the container which includes a filter of adsorptive material adapted to remove gummy materials from chlorine gas discharged from the container, means for controlling the flow of chlorine gas from said filter comprising a pressure reducing valve having in normal operation a passage therethrough so small in size as to become clogged by gummy substances deposited from impure chlorine gas passed therethrough, and a conduit between said filter and said means having walls substantially wholly vitreous in character.

8. An apparatus for supplying a regulated flow of chlorine gas, which comprises a container of liquid chlorine, and a flow line leading from the container which includes a filter of adsorptive material adapted to remove gummy materials from chlorine gas discharged from the container, and means for controlling the flow of chlorine gas from said filter comprising a pressure reducing valve located in close proximity to said filter, said valve having in normal operation a passage therethrough so small in size as to become clogged by gummy substances deposited from impure chlorine gas passed therethrough.

FRANZ C. SCHMELKES.